United States Patent [19]

French

[11] 4,362,258
[45] Dec. 7, 1982

[54] ADD-ON ROOF ASSEMBLY FOR VAN
[75] Inventor: George M. French, Olympia, Wash.
[73] Assignee: Frenkin Corporation, Yelm, Wash.
[21] Appl. No.: 211,573
[22] Filed: Dec. 1, 1980
[51] Int. Cl.³ .............................................. B60P 3/34
[52] U.S. Cl. .................................. 224/309; 224/328; 296/160
[58] Field of Search .............. 224/309, 320, 327, 328, 224/309, 328; 135/1 A; 296/99 R, 160, 156, 173

[56] References Cited
U.S. PATENT DOCUMENTS

| | | | |
|---|---|---|---|
| 3,095,129 | 6/1963 | Kerr | 224/328 X |
| 3,712,316 | 1/1973 | Leonard | 135/1 A |
| 3,713,687 | 1/1973 | Hooks et al. | 296/160 |
| 3,955,731 | 5/1976 | Lindelef et al. | 224/328 |
| 4,055,366 | 10/1977 | Lee | 296/160 |

Primary Examiner—Steven M. Pollard
Attorney, Agent, or Firm—Seed, Berry, Vernon & Baynham

[57] ABSTRACT

An add-on roof assembly for use in converting a van into a camper is adapted to be installed as a unit and has a mounting base for fitting snugly over the rim of the van top and a pop-up top which nests with the base when in lowered position. This top is of two-ply construction, providing ventilation between the two plies.

11 Claims, 5 Drawing Figures

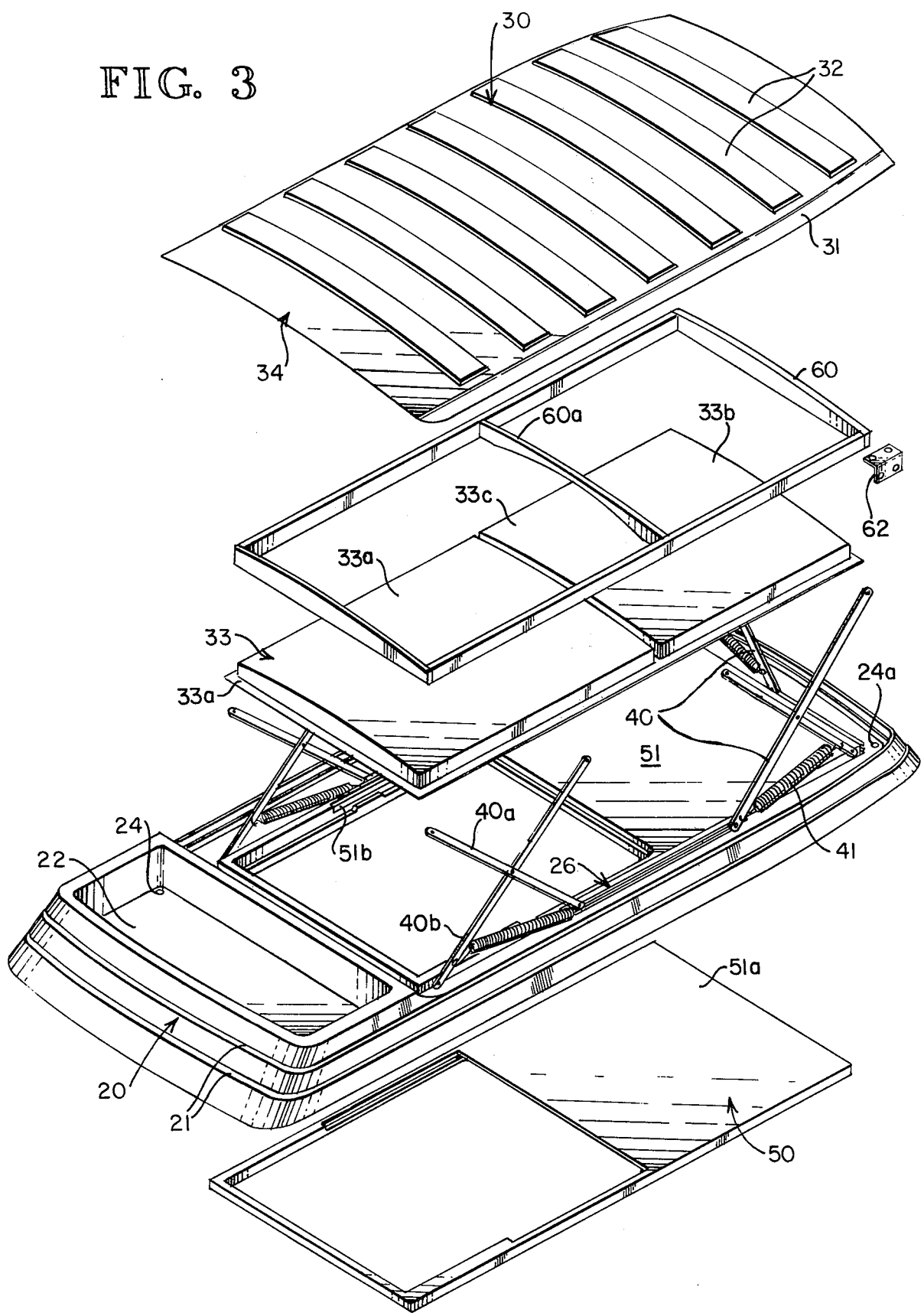

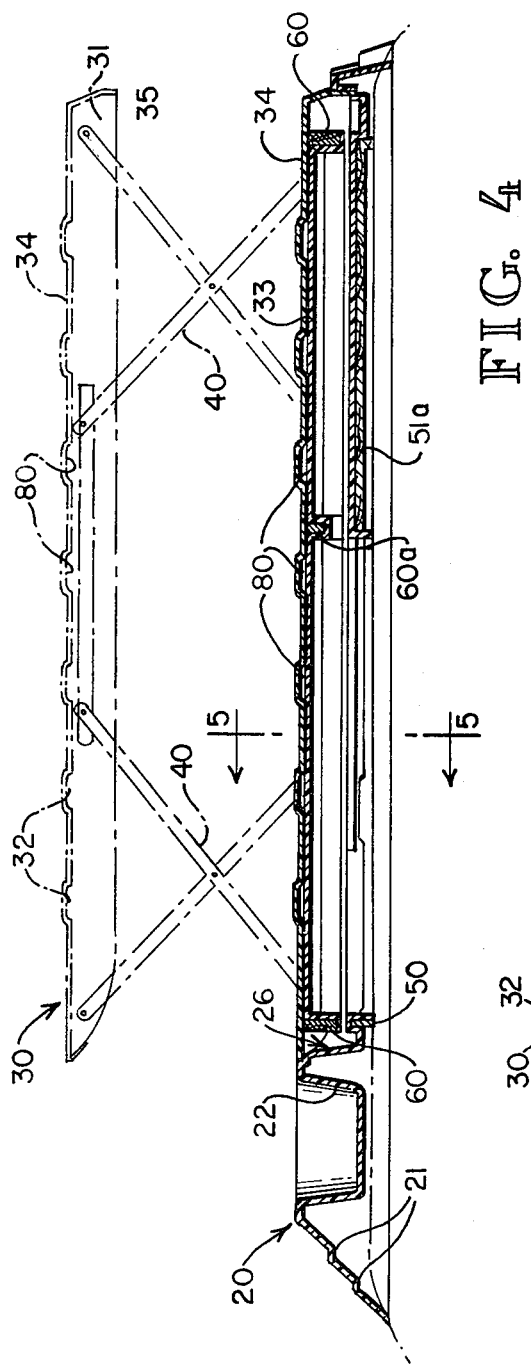
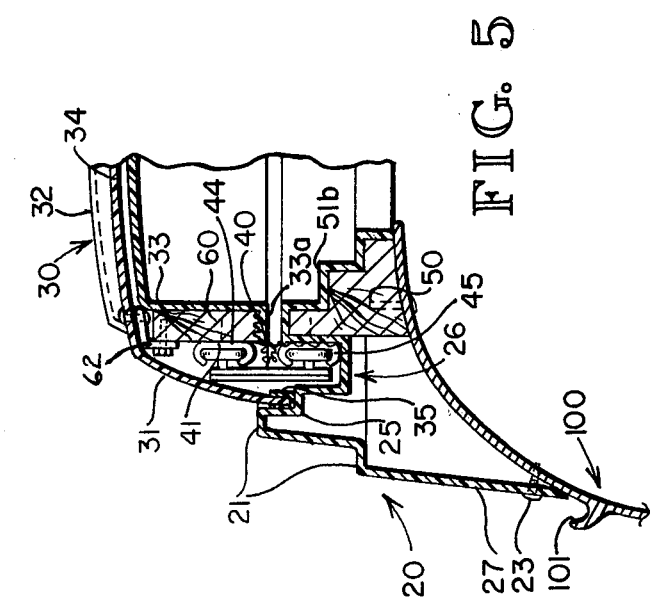

ADD-ON ROOF ASSEMBLY FOR VAN

DESCRIPTION

1. Technical Field

An add-on roof assembly for converting a van body into a pop-top camper body is a primary aspect of this invention. More particularly, this invention relates to a completely prefabricated assembly having a mounting base and inset top unit with elevating support means.

2. Background Art

Various fiberglass add-on roof assemblies have been used to convert a van body into a camper body. The common design is to mount runner hinges to the van roof around a cutaway section therein. The add-on top is then attached to the runner hinges. To provide side sealing, the top rests in the gutters of the van. However, aberrations in the rooflines of vans often make installation of these tops difficult and create sealing problems. Installation is inefficient because the assembly cannot be fully prefabricated since each part must be attached after the hinges are mounted.

DISCLOSURE OF INVENTION

A preferred add-on camper roof assembly for converting a van into a pop-top camper comprises base and top units which can be fully assembled prior to installation on the van. The assembly has a plurality of support means connecting the top to the base unit, preferably scissor supports which are capable of raising or lowering the top between an open position above the base and a closed position wherein the top sealingly fits against the base.

The base preferably has a fiberglass outside skirt which substantially fits to the outside dimensions of the van's roof and has an internal access opening which allows communication between the van's interior and the camper assembly's top through a hole which is cut in the van's roof to increase the headroom. Preferably, the base is attached to the van by fasteners applied around its skirt edges. Attachment may also be made around the hole in the van roof. The skirt is preferably molded with ribbed steps for added strength and rigidity. If a bunk is desired, the base is formed with a platform adjoining the access opening and provision is made at the sides of the latter for supporting a removable extension of the platform to make a full-length bunk. The top is molded with a drain channel surrounding the platform and access opening.

The top preferably comprises an upper, transversely ribbed roof section, a lower ceiling section, and batting with brackets to separate the two sections and lend reinforcement. This two-ply construction provides improved insulation for the assembly when the top is closed, flow-through ventilation between the upper and lower portions when the top is raised, increased condensation protection for the inside of the van, and improved structural integrity. Preferably, the roof and ceiling sections are made from a lightweight plastic, such as thermosetting ABS plastic. The ribbing in the upper portion provides the necessary strength so that glass fiber reinforcement is unnecessary. Preferably, a seal between the top and base is formed by having downwardly projecting side lips of the roof section fit along the outer wall of the channel in the base at the sides of the access opening.

As part of the invention, it is also preferred to form the base unit with a luggage-carrying pocket section forwardly of the access opening to overlie the front portion of the van roof. This section has a rim preferably extending upwardly at least as high as the top unit when in lowered position so as to shield the front of the top unit from the airflow created when the van is underway.

The ribbed steps of the base provide better tolerance for the assembly than the prior art method of attempting to seal along the van gutters. If the skirt on the base need be pulled to meet roofline aberrations, the top will still seat snugly in the base channel because insignificant changes in shape, if any, will occur inwardly of the skirt. In this regard, it is preferred to reinforce the base unit with a bottom wood frame adjoining the inside wall of the base channel.

This add-on roof assembly reduces many of the problems of prior units. Its completely prefabricated structure allows quicker installation. The base with inset top design allows the weight of the assembly to be minimized. Its top section need not be of as heavy construction as the prior art concepts demanded because it is no longer a major structural component. The base provides the required structural rigidity to the assembly; the top need only be strong enough to protect against the weather. The top design provides the advantages of improved insulation, improved condensation protection, and flow-through ventilation above the ceiling. Furthermore, the sealing of the top when in lowered position is improved.

BRIEF DESCRIPTION OF THE DRAWINGS

FIG. 3 is an exploded perspective view of the assembly;

FIG. 4 is a longitudinal cross-section of the add-on top assembly showing the top in lowered position; and FIG. 5 is a partial transverse cross-section taken along line 5—5 of FIG. 4.

BEST MODE FOR CARRYING OUT THE INVENTION

Figure 1:
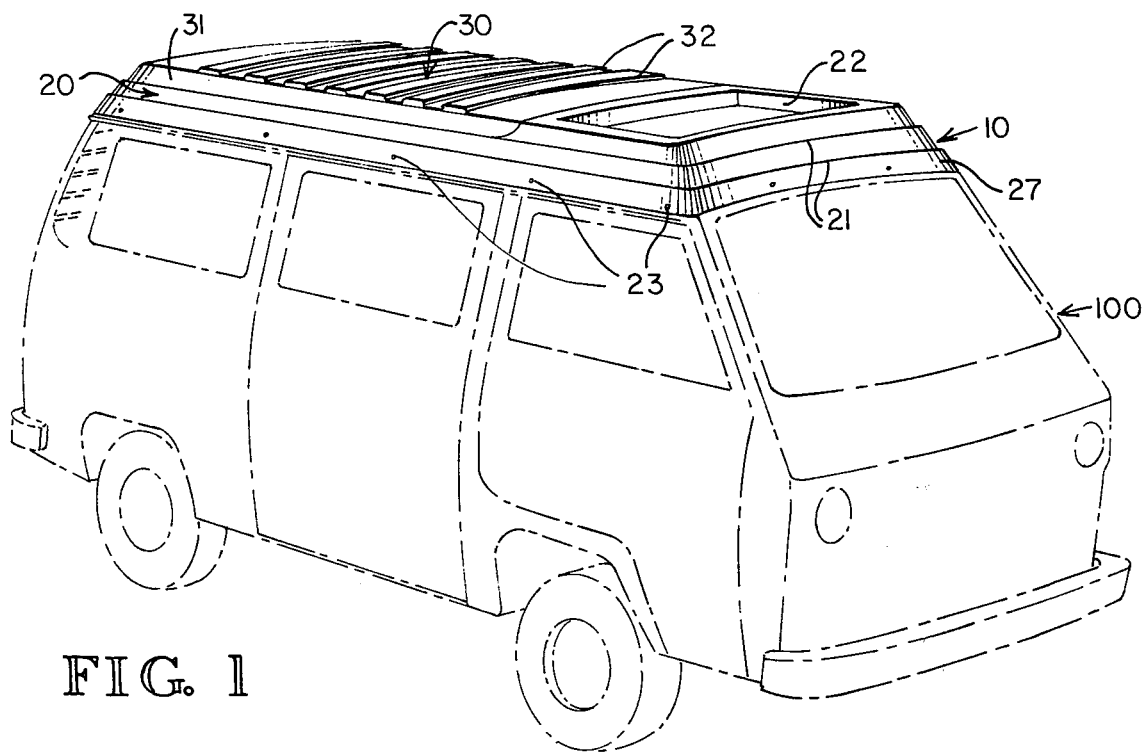
FIG. 1 shows a perspective view of a preferred add-on roof assembly of this invention when the top is lowered.
Figure 2:
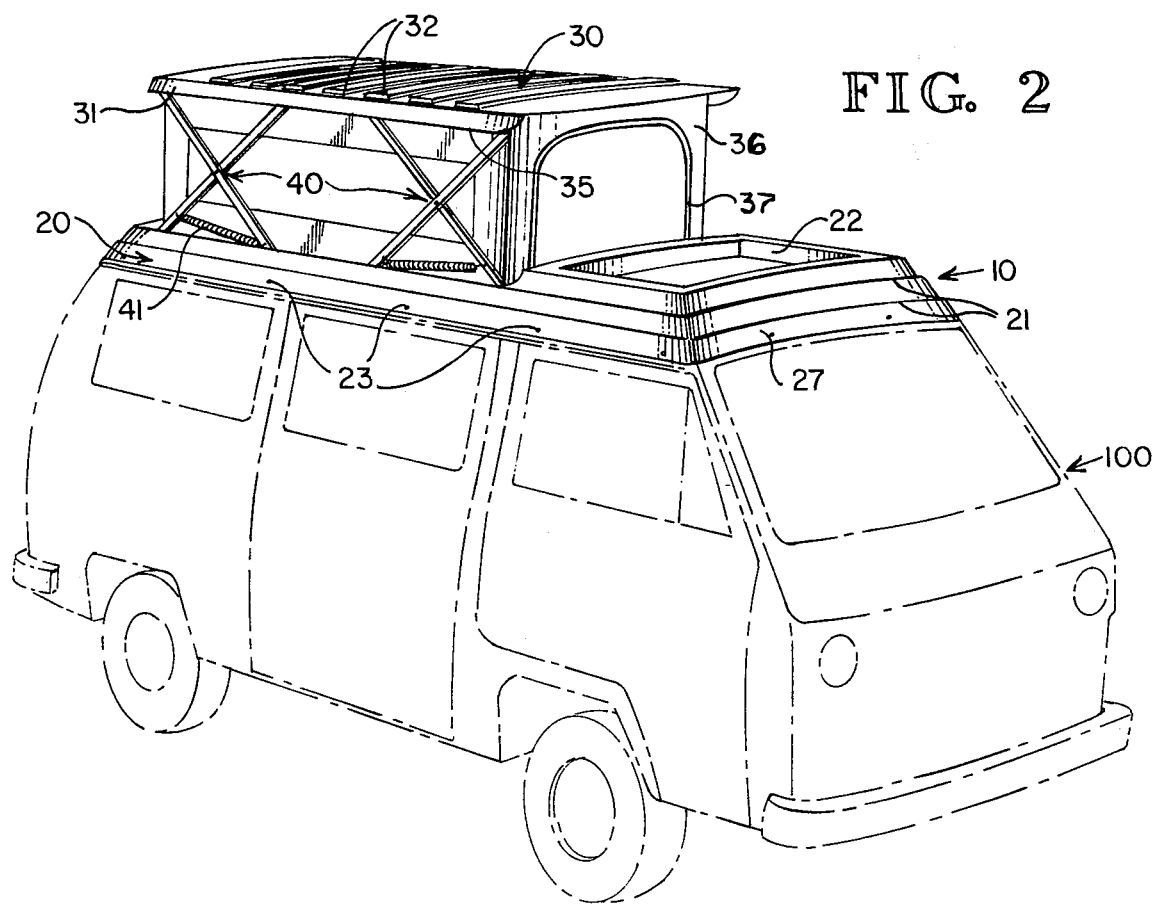
FIG. 2 shows a perspective view of the assembly when the top is raised.

A preferred camper assembly 10 of this invention comprises two primary sections, a mounting base 20 and a top 30 which has elevating support means 40. The mounting base 20 has an outer skirt 27 which is shaped and sized to fit over the roof of a van 100 above its side gutters 101 and is secured to the van roof as by screws 23 or other suitable fasteners. For stiffening purposes, the skirt 27 is formed with steps 21. At the front, the base 20 extends upwardly above the upper of the steps 21 and then is dished downwardly to form a rectangular cavity to serve as a luggage carrier 22 front of the top 30. Corner drain holes 24 may be provided for the luggage carrier.

Behind the luggage carrier 22, the base 20 is formed with an upwardly facing channel 26 which has an outer step on which a pair of longitudinal weatherstripping channels 25 are mounted to receive the lower edges of the side flanges 31 of the roof section 34 when the top 30 is in lowered position, as shown in FIG. 5. From the inner side of the channel 26, the base 20 extends inwardly horizontally, directly beneath the marginal lip 33a of the ceiling section 33, and then drops downward to the front and sides of the access opening and to the sides and rear of a flat platform 51 behind the access opening. At the front of the platform 51, the base 20 is formed with a depending stepped lip which merges with the structure bordering the front and sidewalls of the access opening.

It is preferred to provide the mounting base 20 with a rectangular wood support frame 50 having a rear plywood shelf 51a arranged to underlie and stiffen the platform 51 while the rectangular frame 50 nests beneath the portion of the base 20 situated inwardly of the channel portion 26. The frame 50 is thus arranged to rest on the vehicle roof, to which it may be bolted or otherwise secured to supplement the border screws 23. The stiffened platform 51 may serve as part of a bunk when the top is raised and can be lengthened for this purpose by placing a plywood extension on support shoulders 51b extending forwardly from the platform 51.

Directing attention to FIG. 3, it is seen that the top 30 comprises roof and ceiling sections 33,34 and a stiffening batting 60 nested therebetween. The roof section 34 has depending longitudinal side flanges 31 and preferably is also formed with upwardly dished ribs 32 extending laterally through most of its width to help stiffen the top and to provide ventilating channels between the two top sections, as will later be explained. The ceiling section 33 is formed with a horizontal marginal lip 33a from which a pair of front and back rectangular ceiling panels 33a,33b are dished upwardly and separated by a groove 33c. Batting 60 comprises a rectangular wood frame with a central cross-rib 60a and is sized to nest with the ceiling section 33 such that the frame rests in the marginal lip 33a and the cross-rib fits in the groove 33c. It will be noted that the top 30 is preferably gently arched from side to side.

As best seen in FIG. 5, the roof section 34 is wider than the ceiling section 33 so that there is space provided between the side flanges 31 of the roof section 34 and the opposed sides of the ceiling section 33 to house the upper part of the elevating mechanism and to expose the underside of the ends of the ventilating channels formed by the ribs 32 so that outside air is free to circulate between the ceiling and roof sections 33,34 while the top is elevated. In this regard, the roof section is preferably spaced above the ceiling section 33, not only beneath the rib 32, but also in the areas between these ribs. This gap between the roof and ceiling sections is preferably at least one-fourth inch and may accomplished by the use of angle brackets 62 mounted on the side rails of the batting 60 near the corners thereof and at intermediate points, if desired. As shown in FIG. 5, the brackets 62 extend above the batting 60 and may be bolted or otherwise fastened to the batting 60 and roof section 34.

In the preferred embodiment, the elevating support means 40 for the top 30 comprises sets of pivoted scissor links 40a,40b, each pivotally fixed at one end and slide-mounted at the other end by a respective roller 43 in an upper or lower track 44,45. The upper tracks 44 are secured to the outside of the batting 60 and the lower tracks 45 are mounted against the inner wall of the support frame channel 26 by fasteners anchored in the support frame 50. Respective tension springs 41 between the scissor links of each set counterbalance the weight of the top 30. It is preferred to have two pairs of the scissor links on each side of the top and one set at the rear, as indicated in FIG. 3; but since the top is lightweight, fewer sets of scissor links may be used. Alternatively, other elevating support means may be used, such as, for example, jack screws or telescoping columns.

Four rectangular fabric panels 36 connecting between the ceiling section 34 and the base 20 may be provided to enclose the area between the van top and the top 30 when raised. A zipper 37 in the front panel allows access from the raised interior of the van to the luggage carrier 22. The side panels are preferably provided with flexible, transparent window sections. When the top 20 is being lowered, the panels 36 collapse inwardly.

It will be appreciated that the add-on top assembly of this invention may be completely assembled as a unitary structure before it is installed in a van. In assembling the top 30, the wood frame 60 is first secured to the ceiling section 33 with the upper roller channels 44 and brackets 62 mounted thereon. Then the upper ends of the scissor links 40a are pivotally connected to the frame 60, and the upper rollers on links 40b are positioned in the upper roller channels. Following this, the roof section 32 is secured to the brackets 62 so as to space the roof section above the ceiling section 33.

The mounting base 20 is preferably formed of a suitable glass-reinforced plastic. As previously indicated, glass-reinforcement is not needed for the roof and ceiling sections 32,33. After the reinforcing frame 50 is mounted to the underside of the base 20, the lower tracks 44 are secured in position. Finally, the lower ends of the scissor links 40a are pivotally connected in place and the rollers 45 on the lower end of the links 40b are positioned in the lower tracks.

While particular embodiments of this invention have been shown and described, those skilled in the art will understand that numerous modifications may be made without departing from the scope of this invention. Therefore, this invention should not be limited to these preferred embodiments unless limitation is necessary in light of either the prior art or the scope and nature of the appended claims.

I claim:

1. An add-on roof assembly for a van-type vehicle, comprising:
 a base unit having a peripheral skirt for fitting over the vehicle roof, said base unit having an upwardly facing channel inwardly of said skirt and surrounding an area including an access opening to register with a cutout in the vehicle roof,
 an elevatable top assembly moveable between a lowered position closing said access opening and a raised position spaced above said base unit, said top assembly having a ceiling section and roof section above and wider than the ceiling section to provide overhang portions at the sides of the ceiling section, said overhang portions being downturned to engage the channel when the top assembly is in its lowered position, and
 a pair of roof support means connected to said top assembly and base unit at each side for supporting the top assembly in its raised position, the upper end of the support means being located directly beneath said roof overhang portion and the lower end thereof being located in said channel.

2. An add-on roof assembly according to claim 1 in which said roof section is spaced above said ceiling section through a major part of the area of the latter to provide a ventilating space open at the sides of the ceiling section beneath said overhang portions.

3. An add-on roof assembly according to claim 1 in which said base unit extends forwardly of said top assembly and channel to provide a roof storage area for baggage.

4. An add-on roof assembly according to claim 3 in which the floor of said roof storage area is depressed and surrounded by an upper rim which is as high as the top of said roof section when said top assembly is in lowered position.

5. An add-on roof assembly according to claim 1 in which said roof section is formed with a plurality of laterally extending, downwardly facing ventilating channels open at their ends beneath said overhang portions.

6. An add-on roof assembly according to claim 1 in which said ceiling section is surrounded by a first reinforcing frame, and said base unit has a second reinforcing frame on its underside inwardly of said channel, said elevating means being anchored top and bottom to said first and second frames, respectively.

7. An add-on roof assembly according to claim 1 in which said base unit includes a shelf in said area and a reinforcing frame on the underside of the base unit inwardly of said channel and providing a stiff platform at the underside of said shelf.

8. An add-on assembly according to claim 7 in which the lower ends of said roof support means is anchored to said reinforcing frame.

9. An add-on assembly according to claim 1 in which said ceiling section has a downwardly extending marginal lip and a reinforcing frame surrounding and secured to said lip and secured to said roof section, the upper end of said roof support means also being secured to said frame.

10. An add-on roof assembly for a van having a cutout in its roof for increasing the interior headroom, comprising:

a mounting base unit adapted to seat on the van roof and formed with an internal access opening for registering with the roof cutout, said base unit having an outer peripheral skirt for surrounding the van roof and being adapted to be fastened thereto, an elevatable top unit carried by the mounting base unit for closing said access opening when in a lowered position, said top unit having a weather-sealing interfit with said base unit around said access opening when said top unit is in lowered position, and support means extending between the top unit and the mounting base for guiding and supporting the top unit in movement between said lowered position and a raised position spaced above said base unit to increase the headroom of the van in the area of the roof cutout, in which said base unit has an integral luggage-carrying recessed area located forwardly of said top unit.

11. An add-on roof assembly according to claim 10 in which said access opening has a raised border forming an outside perimeter of the access opening and extending upwardly above said weather-sealing interfit.

* * * * *